United States Patent
Nebout et al.

(10) Patent No.: US 9,964,213 B2
(45) Date of Patent: May 8, 2018

(54) PUMP SEALING DEVICE

(71) Applicant: ALSTOM Technology Ltd, Baden (CH)

(72) Inventors: Nicolas Nebout, Paris (FR); Guillaume Becouarn, Paris (FR)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 308 days.

(21) Appl. No.: 14/561,341

(22) Filed: Dec. 5, 2014

(65) Prior Publication Data
US 2015/0083370 A1    Mar. 26, 2015

Related U.S. Application Data

(63) Continuation of application No. PCT/EP2013/061406, filed on Jun. 3, 2013.

(30) Foreign Application Priority Data

Jun. 6, 2012 (FR) .................................. 12 55282

(51) Int. Cl.
*F04D 29/12* (2006.01)
*F16J 15/06* (2006.01)
(Continued)

(52) U.S. Cl.
CPC .............. *F16J 15/064* (2013.01); *F04D 7/08* (2013.01); *F04D 29/128* (2013.01);
(Continued)

(58) Field of Classification Search
CPC ......... F16J 15/064; F04D 7/08; F04D 29/128; F04D 29/588; F28D 15/00; G21D 1/04
(Continued)

(56) References Cited

U.S. PATENT DOCUMENTS 2,687,695 A * 8/1954 Blom .................. F04D 13/0613
310/54
3,467,396 A * 9/1969 Hershey ................ F04D 29/126
277/362
(Continued)

FOREIGN PATENT DOCUMENTS

DE    34 04 964 A1    8/1985
DE    19501900 A1    7/1996
(Continued)

OTHER PUBLICATIONS

Unofficial English Translation of Chinese Office Action issued in connection with corresponding CN Application No. 201380029628.8 dated Mar. 23, 2016.

*Primary Examiner* — Aaron R Eastman
(74) *Attorney, Agent, or Firm* — GE Global Patent Operation; Cynthia W. Flanigan

(57) ABSTRACT

The invention relates to a device for sealing a pump of a nuclear power station. Said includes: a mechanical packing and a fluid header. The header includes:
a first plurality of surfaces that cooperate with said mechanical packing;
a second plurality of surfaces that are designed to cooperate with a pump housing; and
a plurality of ducts. The plurality of ducts form, in an operating state, a first fluid circuit that constitutes a thermal barrier between the first plurality of surfaces and the second plurality of surfaces, and a second fluid circuit that supplies fluid to said mechanical packing in order to cool it.

20 Claims, 1 Drawing Sheet

(51) Int. Cl.
*F04D 7/08* (2006.01)
*F04D 29/58* (2006.01)
*F28D 15/00* (2006.01)
*G21D 1/04* (2006.01)

(52) U.S. Cl.
CPC ........... *F04D 29/588* (2013.01); *F28D 15/00* (2013.01); *G21D 1/04* (2013.01)

(58) Field of Classification Search
USPC ........................................................ 415/112
See application file for complete search history.

(56) References Cited

U.S. PATENT DOCUMENTS

| | | | |
|---|---|---|---|
| 3,597,102 A * | 8/1971 | Unsworth | F01D 11/10 277/431 |
| 3,843,140 A * | 10/1974 | Mayer | F04D 29/128 277/360 |
| 4,033,141 A * | 7/1977 | Gustafsson | F25B 27/00 60/651 |
| 5,827,042 A * | 10/1998 | Ramsay | F04D 3/02 415/112 |
| 5,908,020 A * | 6/1999 | Boutwell | B01D 35/027 123/41.31 |
| 6,200,108 B1 * | 3/2001 | Caudill | F04D 13/06 165/47 |
| 6,397,822 B1 * | 6/2002 | Ulm | F02M 31/20 123/25 R |
| 7,581,517 B2 * | 9/2009 | Brown | F01P 7/16 123/41.09 |
| 2005/0179208 A1 | 8/2005 | Meuter | |
| 2011/0198813 A1 | 8/2011 | Takahashi | |

FOREIGN PATENT DOCUMENTS

FR 2 607 874 A1 6/1988
GB 2 106 593 A 4/1983

* cited by examiner

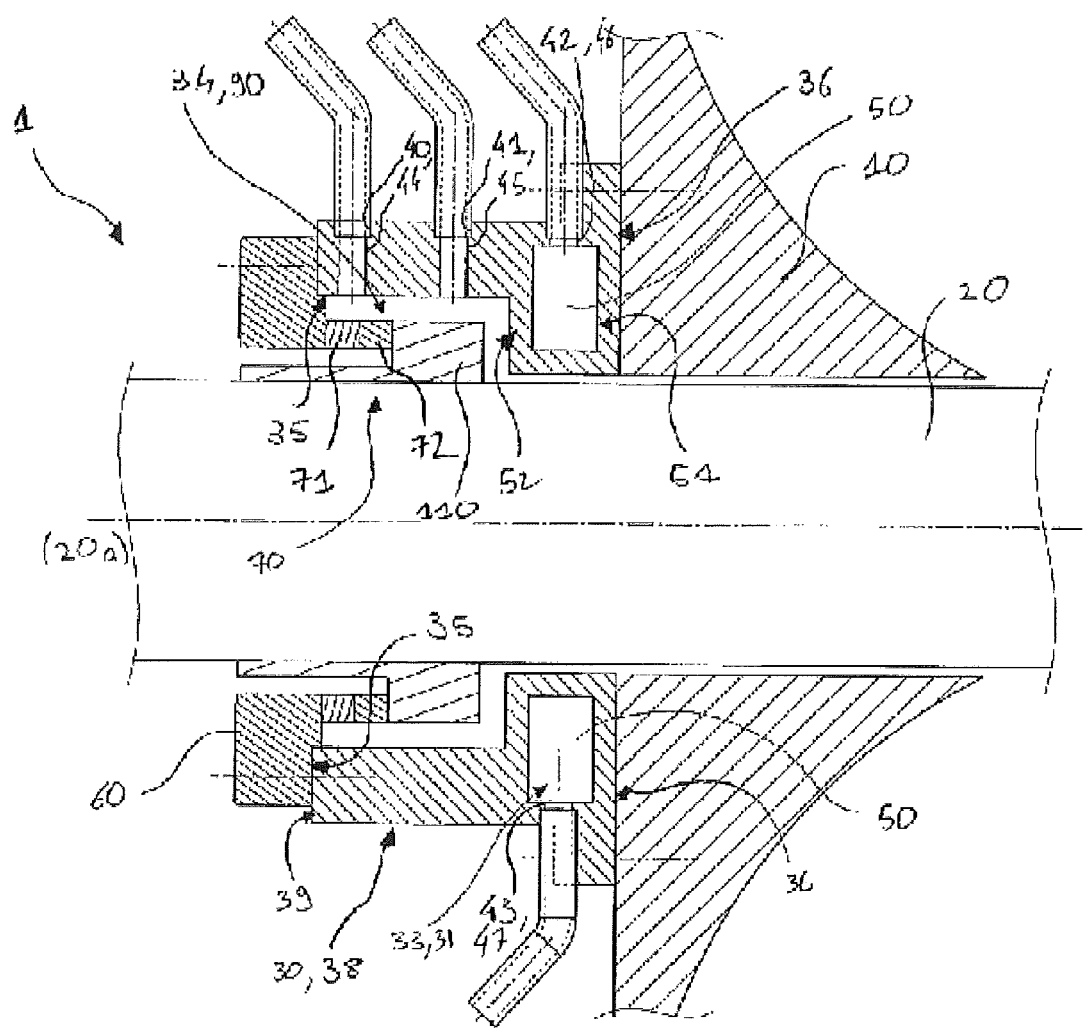

PUMP SEALING DEVICE

CROSS-REFERENCE TO RELATED APPLICATIONS

This application claims priority to PCT/EP2013/061406 filed Jun. 3, 2013, which claims priority French application 1255282 filed Jun. 6, 2012, both of which are hereby incorporated in their entireties.

TECHNICAL FIELD

The invention relates to a pump sealing device. More particularly, it relates to a device for sealing a pump of a nuclear power station. It may also relate to a fossil fuel power station, in particular one that produces electricity by burning coal, fuel oil or natural gas. In the case of a nuclear power station, it is a pump which has the function of sending water to heaters located upstream of the inlet to the reactor.

BACKGROUND

According to the prior art, the thermal barrier function and the function of cooling the friction elements of the mechanical packing are carried out by tappings (ducts that supply certain zones and have inlet(s) and outlet(s) are defined as tappings) arranged in the pump housing, the mechanical packing and in the fluid header, if there is one. Existing techniques make maintenance difficult, since piping has to be removed beforehand. Moreover, the arrangement of numerous tappings in standard components increases costs, in particular because of the holes and the welding of the supply piping. Such devices make it more difficult to carry out maintenance on the sealing device inasmuch as the tappings are made in the mechanical packing and the pump housing.

In this context, the problem set here is to produce a pump sealing device of the abovementioned type, which has a simple structure and facilitates maintenance of said device and improves the service life of the device.

The mechanical packing provides sealing at the end of the shaft and on the outside of the pump housing. The temperature of the mechanical packing and of the water flowing near the mechanical packing must not exceed a threshold temperature, conventionally 100° C. However, typically, the water which flows through the pump is at a temperature of around 200° C. Given the mechanical properties of the packing and in particular of the stationary face ring and the rotating face ring and the arrangement thereof in the sealing device, it is important to protect them from excessive heat in order to protect them from deterioration in their operating state. Specifically, an exchange of heat by conduction between the pump housing and the mechanical packing can impair correct operation of the seal and in particular the seal at the point between the stationary face ring and the rotating face ring. Moreover, friction between the rotating part of the mechanical packing defined by the rotating face ring of the packing, on the one hand, and the stationary part defined by the stationary face ring of the packing, on the other hand, dissipates energy in the form of heat, leading to an increase in the temperature and premature wear of the stationary face ring and rotating face ring. Thus, in order to increase the service life of the mechanical packing, provision is made for the mechanical packing to be cooled at the points where friction takes place, i.e. at that point in the mechanical packing and, more precisely, at the point where there is a relative movement between the stationary face ring and the rotating face ring.

Furthermore, the present invention aims in particular to optimize the maintenance of the sealing device and to increase the service life of the sealing device.

The solution proposed by the present invention is that the pump sealing device comprises:
  a mechanical packing,
  a fluid header comprising:
    a first plurality of surfaces that cooperate with said mechanical packing;
    a second plurality of surfaces that are designed to cooperate with a pump housing;
    a plurality of ducts that form, in an operating state, a first fluid circuit that constitutes a thermal barrier between the first plurality of surfaces and the second plurality of surfaces, and a second fluid circuit that supplies fluid to said mechanical packing in order to cool it.

Such an arrangement advantageously facilitates maintenance and increases the service life of the sealing device by proposing a sealing device in which a fluid header is incorporated. The fluid header, which is included between the mechanical packing which is to be protected and the pump housing that defines a hot zone, incorporates first and second circuits. The function of the first circuit, which circulates in the fluid header between the pump housing and the packing, is to form a thermal barrier in order to protect the packing from the heat dissipated by the pump housing and caused by the hot water flowing through said pump. The function of the second fluid circuit, which supplies fluid to the packing, is to cool the packing in order to lower the temperature so as to allow the sealing device to be used with no risk of leakage—this then preventing pump water from coming into contact with the external surroundings.

Furthermore, maintenance is facilitated on account of the fact that the header tank mechanically welded between the pump housing and the packing makes it possible to combine the two functions in a simple manner. Thus, it is not necessary for there to be tapping on the pump housing and on the packing. Furthermore, the device does not include a seal at the point of the thermal barrier and no hole in the pump housing in order to supply the thermal barrier.

In another embodiment of the invention, the thermal barrier might be formed by a recess that separates the first portion and the second portion of said fluid header, said first portion being intended to be oriented alongside a hot zone and said second portion being intended to be oriented alongside said packing, said recess containing a fluid.

In another embodiment of the invention, a space defining an exchange zone, between the mechanical packing and the fluid header, which is adjacent to friction elements of said mechanical packing, might contain a fluid for cooling said elements.

In one embodiment, the fluid header comprises a first duct and a second duct for respectively supplying and evacuating the second fluid circuit, said first duct and second duct each extending from a radially outer surface of the fluid header to said space that communicates with the packing.

In one embodiment, the fluid header comprises:
  a third duct for supplying said recess, said third duct extending from a radially outer surface of the header to a first internal duct arranged inside said fluid header;

a fourth duct for evacuating said recess, said fourth duct extending from said radially outer surface of the header to a second internal duct arranged inside said fluid header.

In one embodiment, the recess extends radially inside the header, defining an annular shape.

In another embodiment of the invention, the first fluid circuit and the second fluid circuit are connected to a fluid-cooling device.

BRIEF DESCRIPTION OF THE DRAWINGS

Other features and advantages will become further apparent from the description given in the following text, by way of entirely nonlimiting indication, with reference to FIG. 1, which shows a sectional view of an example of a sealing device.

DETAILED DESCRIPTION

Two sealing devices 1 are provided to prevent pressurized hot water from getting out into the external atmosphere while at the same time not impeding the rotation of the shaft 20. Each of the two sealing devices 1 is arranged at each exit of the shaft 20.

Each of these devices 1 comprises:
a pump housing 10 which contains pressurized hot water and also the energy recuperation members;
a rotary shaft 20 which supports the impeller, the vanes of which impart motor power to this hot water, said shaft 20 emerging from each side of the housing 10 in order to rest on bearings; one of its ends is coupled to a drive system (not shown); the exits of the shaft 20 are sealed by sealing devices 1;
a fluid header 30 which is fixed to the pump housing 10 by fixing means;
a fixing cover 60 which fixes the mechanical packing 70 to the pump, and more precisely to the inside of the fluid header 30;
a rotating face ring 72 that rotates with the shaft 20 and which is in surface-to-surface contact with a stationary face ring 71; sealing occurs at the interface between these two face rings;
the stationary face ring 71, which is held pressed against the rotating face ring 72, may be able to move only in translation;
a rotating face-ring carrier which holds the rotating face ring;
a non-rotating face-ring carrier which holds the stationary face ring 71 and allows the face ring to move in a translational movement;
a mechanical packing 70 liner connected to the shaft 20; this forms a wall of the mechanical packing 70 in contact with the shaft 20 while protecting the latter.

The sealing device 1 is intended to be positioned between the rotary shaft 20 and the pump housing 10. More precisely, the device 1 is located at the exit of the shaft 20, outside the pump housing 10, in order to prevent pressurized hot water that circulates through the pump housing 10 from flowing out of said pump housing 10. Furthermore, the sealing device 1, the rotary shaft 20 and the pump housing 10 are arranged together so as not to impede the rotation of the shaft 20 with respect to the pump housing 10. The shaft 20 rotates about an axis 20a.

The mechanical packing 70, which defines a sealing means, is fitted to the sealing device 1. The mechanical packing 70 comprises said stationary sealing face ring 71 which is connected in a sealed manner to the fluid header 30 and said rotating sealing face ring 72 which is connected in a sealed manner to the rotary shaft 20. When the shaft 20 rotates about its axis 20a, the rotating face ring 72 rubs against the stationary face ring 71 over an annular friction surface. Each of the stationary face ring and the rotating face ring has: radially outer surfaces and radially inner surfaces. At least a portion of the radially outer surfaces communicate with a space 90 that defines an exchange zone. The space 90 that defines an exchange zone is included between that part of the packing 70 that is oriented radially toward the outside and the fluid header 30 and is adjacent to the friction elements formed by the stationary face ring 71 and the rotating face ring 72. In the operating state, the space 90 contains a fluid for cooling the friction elements. Each of the stationary face ring 71 and the rotating face ring 72 also has radially inner surfaces adjacent to the shaft 20.

The device 1 may comprise face ring pressing means for axially pressing the stationary face ring 71 and the rotating face ring 72 against one another. The function of these means is to maintain the contact between the stationary face ring 71 and the rotating face ring 72.

The fluid header 30 is arranged between the pump housing 10 and the mechanical packing 70. Its function is to form a thermal barrier 31 between the pump housing 10 and the mechanical packing 70 and to cool the mechanical packing 70, in particular the stationary face ring and the rotating face ring. Thus, this header 30 is intended essentially to protect the mechanical packing 70 from external attack, in particular in the form of heat, and to increase its service life. The fluid header 30 comprises a plurality of ducts 44, 45, 46, 47 that form, in the operating state, a first fluid circuit 33 that forms a thermal barrier 31 between the first plurality of surfaces 35 and the second plurality of surfaces 36 of the fluid header 30, and a second fluid circuit 34 that supplies the mechanical packing 70 with water in order to cool it.

In another embodiment of the invention, the fluid header 30 comprises four tappings: a first tapping 40 for supplying the mechanical packing 70 with fluid, a second tapping 41 for evacuating the fluid from the mechanical packing 70, a third tapping 42 for supplying the thermal barrier 31 and a fourth tapping 43 for evacuating the fluid from the thermal barrier 31.

Preferably, a first duct 44 extends from the radially outer surface 38 of the fluid header 30 (adjacent to the first tapping 40) to the space 90 that communicates with the packing 70. By way of example, this first duct 44 may pass through the fluid header 30 from one end to the other, radially.

Preferably, a second duct 45 extends from the space 90 that communicates with the packing 70 to the radially outer surface 38 of the fluid header 30 (adjacent to the second tapping 41). This second duct 45 extends in a second direction, passing from one end of the fluid header 30 to the other. The first duct 44 and the second duct 45 are arranged such that the first and second directions are not concurrent.

Preferably, in one embodiment, a third duct 46 extends from the radially outer surface 38 of the fluid header 30 and communicates with a recess 50 that forms a thermal barrier 31 in the operating state.

In order to evacuate the water from the thermal barrier 31, the recess 50 communicates with a fourth duct 47 which extends as far as the radially outer surface 38 of the fluid header 30, adjacent to the fourth tapping 43.

In one embodiment, the first tapping 40, second tapping 41, third tapping 42 and fourth tapping 43 may also be arranged on the surface 39 so as to be substantially at right angles to the axis 20a and oriented toward the opposite side where the pump housing 10 is located. The first duct 44, second duct 45, third duct 46, and fourth duct 47 would then be formed as a result; by way of example, the directions defined by the first duct 44, second duct 45, third duct 46 and fourth duct 47 would be arranged so as not to be concurrent.

The circuit for cooling the packing 70 is then supplied via the first tapping 40, runs through the first duct 44, and then brings the fluid into communication with the stationary face ring and rotating face ring, in the space 90. The fluid contained in the space 90 is then evacuated via the second duct 45 and exits the fluid header 30 via the second tapping 41.

The fluid circuit that forms a thermal barrier 31 is then supplied via the third tapping 42, runs through the third duct 46, then possibly through a first internal duct, before progressively and circumferentially filling the recess 50. The fluid contained in the recess 50 can then be evacuated via the fourth duct 47 and may exit the fluid header 30 via the fourth tapping 43.

In an embodiment shown in FIG. 1, the recess 50 separates a first portion 51 and a second portion 52 of the header tank 30. The first portion 51 is the portion that is intended to be oriented alongside a hot zone, near to the pump housing 10, and the second portion 52 is intended to be oriented alongside the packing 70, that is to say the element that is to be thermally protected.

FIG. 1 shows an embodiment in which the recess 50 extends radially on the inside of the fluid header 30 and defines a ring.

In one embodiment of the invention, the second fluid circuit 34 that supplies water to the packing 70 passes through an exchanger in order to cool its water. In the same way, the first fluid circuit 33 supplies the thermal barrier 31, preferably permanently, with water originating from a cold source of the river water or seawater type.

The pump sealing device 1 comprises the mechanical packing and the fluid header. This fluid header comprises the first plurality of surfaces 35 that cooperate with the mechanical packing 70 and the second plurality of surfaces 36 that are designed to cooperate with the pump housing 10.

In the operating state, the fluid header furthermore comprises a first fluid circuit 33 that forms a thermal barrier 31 between the first plurality of surfaces 35 and the second plurality of surfaces 36, and a second fluid circuit 34 that supplies said mechanical packing 70 with water in order to cool it.

According to another embodiment, a space 90 that defines an exchange zone, between the mechanical packing 70 and the fluid header 30, which is adjacent to friction elements of said mechanical packing 70, contains a fluid for cooling said elements.

What is clamed is:

1. A device for sealing a pump of a nuclear power station, said device comprising:
    a mechanical packing, and
    a fluid header including:
        a first plurality of surfaces that cooperate with said mechanical packing;
        a second plurality of surfaces that are designed to cooperate with a pump housing;
        a plurality of ducts that form, in an operating state, a first fluid circuit that constitutes a thermal barrier between the first plurality of surfaces and the second plurality of surfaces, and a second fluid circuit that supplies fluid to said mechanical packing in order to cool said mechanical packing; wherein said mechanical packing comprises a stationary sealing face ring which is connected in a sealed manner to the fluid header; and
    wherein the fluid header is arranged between the pump housing and the mechanical packing.

2. The device as claimed in claim 1, wherein the thermal barrier is formed by a recess that separates a first portion and a second portion of the fluid header, said first portion being intended to be oriented alongside a hot zone and said second portion being intended to be oriented alongside said mechanical packing, said recess containing the fluid.

3. The device as claimed in claim 2, wherein a space defining an exchange zone, between the mechanical packing and the fluid header, which is adjacent to friction elements of said mechanical packing, contains the fluid for cooling said friction elements.

4. The device as claimed in claim 3, wherein the fluid header comprises a first duct and a second duct for respectively supplying and evacuating the second fluid circuit, each of said first duct and second duct extending from a radially outer surface of the fluid header to said space that communicates with the mechanical packing.

5. The device as claimed in claim 2, wherein the fluid header comprises:
    a third duct for supplying said recess, said third duct extending from a radially outer surface of the fluid header to a first internal duct arranged inside said fluid header;
    a fourth duct for evacuating said recess, said fourth duct extending from said radially outer surface of the fluid header to a second internal duct arranged inside said fluid header.

6. The device as claimed in claim 2, wherein the recess extends radially inside the fluid header, defining an annular shape.

7. The device as claimed in claim 1, wherein the first fluid circuit and the second fluid circuit are connected to a fluid-cooling device.

8. The device as claimed in claim 1, wherein the device further comprises a rotary shaft emerging from each side of the pump housing and wherein exits of the rotary shaft are sealed by the device.

9. The device as claimed in claim 8, wherein the device further comprises a rotating face ring rotating with the rotary shaft and in a surface-to-surface contact with the stationary sealing face ring.

10. The device as claimed in claim 9, wherein the device further comprises a face ring pressing means for axially pressing the stationary sealing face ring and the rotating face ring against one another.

11. The device as claimed in claim 10, wherein the device further comprises a rotating face ring carrier for holding the rotating face ring and a non-rotating face-ring carrier for holding the stationary sealing face ring and allowing the stationary sealing face ring to move.

12. The device as claimed in claim 1, wherein the fluid header is fixed to the pump housing by fixing means.

13. The device as claimed in claim 1, wherein the device further comprises a fixing cover which fixes the mechanical packing to the pump.

14. The device as claimed in claim 1, wherein the fluid header comprises a plurality of tappings for supplying the fluid to the respective ducts of the plurality of ducts, wherein
    a first tapping of the plurality of tappings is provided for supplying the fluid to the mechanical packing;
    a second tapping of the plurality of tappings is provided for evacuating the fluid from the mechanical packing;

a third tapping of the plurality of tappings is provided for supplying the fluid to the thermal barrier; and a fourth tapping of the plurality of tappings is provided for evacuating the fluid from the thermal barrier.

15. The device as claimed in claim 14, wherein the first tapping, the second tapping, the third tapping, and the fourth tapping are arranged on a surface so as to be at right angles to an axis of a rotary shaft.

16. The device as claimed in claim 1, wherein the first fluid circuit supplies the thermal barrier with water originating from a source of river water or seawater.

17. A method for sealing a pump of a nuclear power station, the method comprising:
designing a first plurality of surfaces to cooperate with a mechanical packing;
designing a second plurality of surfaces to cooperate with a pump housing;
forming a plurality of ducts that form, in an operating state, a first fluid circuit that constitutes a thermal barrier between the first plurality of surfaces and the second plurality of surfaces, a second fluid circuit that supplies fluid to said mechanical packing for cooling the mechanical packing, and connecting a stationary sealing face ring in a sealed manner, comprised in the mechanical packing, to a fluid header; and
wherein the fluid header is arranged between the pump housing and the mechanical packing.

18. The method as claimed in claim 17, wherein the method further comprises forming a space defining an exchange zone, between the mechanical packing and the fluid header, which is adjacent to friction elements of said mechanical packing, containing the fluid for cooling said friction elements.

19. The method as claimed in claim 17, wherein forming the second fluid circuit further comprises supplying the fluid by means of a first tapping which runs through a first duct and brings the fluid in communication with a stationary sealing face ring and a rotating face ring, in a space, evacuating the space by means of a second duct, and exiting through a second tapping.

20. The method as claimed in claim 17, wherein forming the first fluid circuit further comprises supplying the fluid by means of a third tapping which runs through a third duct thereby filling a recess, evacuating the recess by means of a fourth duct, and exiting through a fourth tapping.

* * * * *